Sept. 24, 1968  J. T. MAYNARD  3,403,315
CONDITION RESPONSIVE CONTROL CIRCUIT CONNECTED TO
GATE A TRIGGERED SWITCH
Filed Oct. 22, 1965

INVENTOR
JOHN T. MAYNARD
BY
Merl E. Sceales
Attorney

United States Patent Office 3,403,315
Patented Sept. 24, 1968

3,403,315
CONDITION RESPONSIVE CONTROL CIRCUIT CONNECTED TO GATE A TRIGGERED SWITCH
John T. Maynard, New Berlin, Wis., assignor to A. O. Smith Corporation, Milwaukee, Wis., a corporation of New York
Filed Oct. 22, 1965, Ser. No. 500,968
6 Claims. (Cl. 318—227)

ABSTRACT OF THE DISCLOSURE

A motor is connected to the power lines in series with a symmetrical switch such as a "Triac." A firing signal is applied through a symmetrical switching device which maintains an open circuit condition until a selected breakdown voltage is applied across the device after which it conducts. The trigger signal is generated by an alternating current network including a thermistor connected in series with a timing capacitor. A voltage regulator is connected across the thermistor and the capacitor to maintain an essentially constant voltage across the timing circuit for any one temperature. Variations in the resistance of the thermistor with temperature changes results in a corresponding variation in the voltage division across the timing circuit and in the time constant of the circuit. Consequently, the thermistor produces a dual action in the timing circuit and increases the sensitivity of the output with temperature. The voltage regulator is shown as a neon bulb and as a diode bridge having a Zener type diode connected across the D.C. terminals with the input terminals connected across the combination of the thermistor and the timing capacitor.

---

Figure 1:
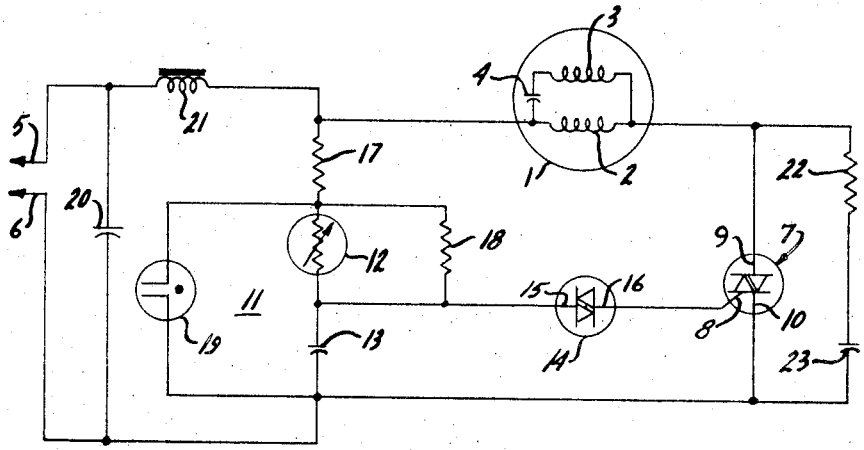

This invention relates to a condition responsive control circuit and particularly to a temperature responsive speed control circuit for a permanent split capacitor motor and the like.

Alternating current motors and particularly permanent split capacitor motors have recently become of general interest in variable speed motor applications with the development of reliable, simple and relatively inexpensive solid state control circuits. For example, applicant's co-pending application entitled, Dynamoelectric Machine and Control Therefor, which was filed on Jan. 29, 1965, with Ser. No. 428,975, now Pat. No. 3,353,078, and assigned to a common assignee with this application discloses a particularly satisfactory semi-conductor circuit for speed control wherein the solid state control circuit is mounted as an integrated part of the motor structure, and particularly within the end bell to provide a small compact unit with maximum cooling of the components.

Generally, in accordance with the illustrated control circuit therein, the motor is connected to the power lines in series with a triggered symmetrical switching device having the characteristic of normally maintaining an open circuit condition. If a signal is applied to a firing terminal or gate of the device, it is switched to a highly conductive state and continues to conduct for the balance of the half cycle of the alternating current. The switching device inherently returns to a nonconducting condition when the current drops to zero and reverses. The firing signal is applied through a symmetrical switching device which maintains an open circuit condition until a selected breakdown voltage is applied across the device after which it conducts. The trigger signal is generated by an alternating current network including a thermistor or other temperature sensitive element connected in a timing circuit with a capacitor. As the temperature changes, the resistance changes and varies the time constant of the timing circuit. This in turn varies the time in each half cycle that the capacitor reaches the firing level and discharges through the firing circuit to trigger the switching device and reset the timing circuit for functioning during the subsequent half cycle.

The present invention is particularly directed to an improvement and modification of the timing and triggering circuit to increase the sensitivity and response of the circuit whereby the voltage impressed upon the motor varies between a zero or minimum output and a full output for a relatively small temperature variation.

In accordance with the present invention, a voltage regulator is connected across the temperature sensing element such as a thermistor and the capacitor of the timing circuit to maintain an essentially constant voltage across the timing circuit for any one temperature. Variations in the resistance of the thermistor with temperature changes results in a corresponding variation in the voltage division across the timing circuit and in the time constant of the circuit. Consequently, the thermistor produces a dual action in the timing circuit and increases the sensitivity of the output with temperature. Although the voltage regulator can be any suitable device, and may in fact be a simple neon bulb, applicant has also made a particularly satisfactory and novel voltage regulator. Generally, this regulator includes a diode bridge having a Zener type diode connected across the D.C. terminals. The input terminals are connected across the combination of the thermistor and the timing capacitor. The Zener type diode fires at a precise point in the successive half cycle of the alternating current voltage and applies a highly symmetrical regulated voltage across the timing circuit, in contrast to a neon bulb wherein the firing point may shift slightly during adjacent half cycles and generate a small direct current component into the power circuit of the motor. This circuit also permits maximum output voltage and has a stable set point with substantial variations in the input voltage.

The present invention thus provides a very reliable and simple means with a relatively minimum cost for increasing the sensitivity of the circuit and permitting selection of a narrow or wide operating temperature range over which a desired voltage or speed control may be obtained. The circuit provides highly stable operations with variations in input voltage.

The drawing furnished herewith illustrates preferred constructions of the present invention for which the above advantages and features are clearly shown as well as others which will be clear from the following description.

Figure 2:
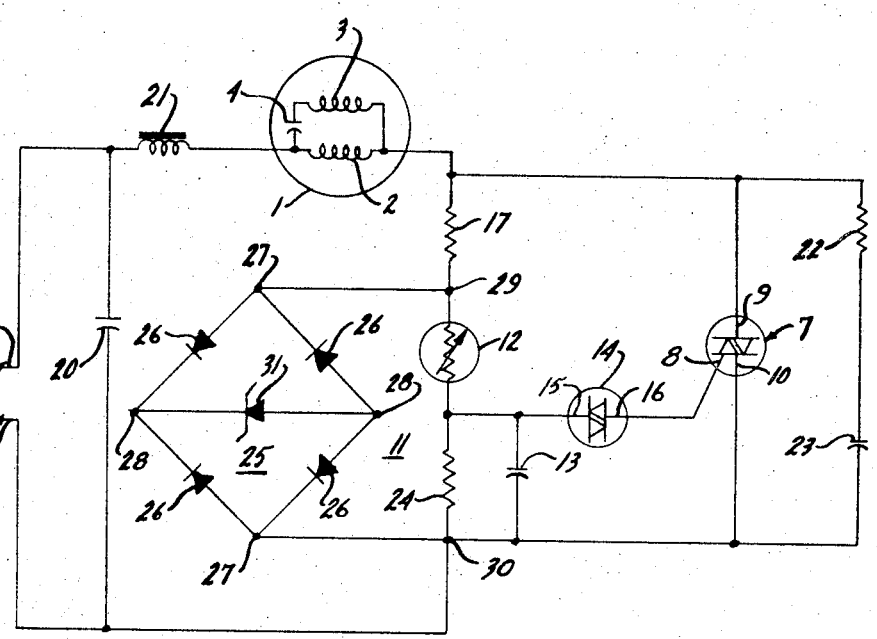

In the drawing:
FIG. 1 is a schematic circuit diagram of a split capacitor motor control circuit constructed in accordance with the present invention; and
FIG. 2 is a view similar to FIG. 1 showing the improved diode bridge regulator connected to regulate the voltage across the temperature sensitive firing circuit.

Referring to the drawings and particularly to FIG. 1, a permanent split capacitor motor 1 is schematically shown including a running winding 2 connected in parallel with a starting winding 3 and a capacitor 4. The parallel motor winding circuit is connected to suitable alternating current power leads 5 and 6 in series with a triggered symmetrical switch 7 shown schematically as a "Triac" in accordance with the illustration in the Aug. 19, 1964, issue of Home Appliance Builder.

Briefly, the switch 7 generally functions as a pair of paralleled and oppositely polarized controlled rectifiers but with a single gate 8 controlling conduction between a pair of main electrodes or terminals 9 and 10, connected respectively to the one side of paralleled motor windings 2 and 3 and to the power line 6. Switch 7 is normally nonconducting and thus opens the motor winding circuit. A current at the gate 8 triggers the switch 7 to conduct in either direction and for the corresponding half cycle of the alternating current power. The switch 7 automatically turns off or becomes nonconducting when the current drops to zero and reverses and does not turn on until another signal is applied to the gate.

The switch 7 is controlled by a temperature sensing control circuit 11 connected to the alternating current power lines 5 and 6. The circuit 11 includes a thermistor 12 connected in series with a capacitor 13 across lines 5 and 6 to form a timing circuit. The junction of thermistor 12 and capacitor 13 is connected in series with a symmetrical switch 14 to the gate of the switch 7. The switch 14 is shown as a symmetrical alternating current solid state switch sold under the trade name "Diac" as disclosed in the previously referred to issue of Home Appliance Builder. The switch 14 is a device which normally maintains an open circuit but which breaks down and conducts at a selected voltage applied directly across a pair of main terminals or electrodes 15 and 16.

The illustrated timing circuit 11 includes a current limiting resistor 17 connected between the line 5 and thermistor 12. A tuning resistor 18 is connected in parallel with the thermistor 12 to bypass some of the current from thermistor 12 and to shift the temperature range by changof the resistor.

In accordance with the embodiment of the invention shown in FIG. 1, a neon lamp 19 is connected across the thermistor 12 and the capacitor 13 and in accordance with well known theory functions to clip the top portion of each of the half cycles of the alternating current voltage. As the alternating current voltage increases, it reaches the neon triggering voltage and the lamp switches to a highly conductive state. The voltage drops due to the characteristic of a neon lamp, after which the voltage remains constant until the impressed voltage drops below the constant voltage. The lamp 19 then follows the normal current voltage wave to zero. An essentially constant voltage is therefore established across the thermistor 12 and capacitor 13. The only variations is essentially due to the slight change in the initial rate of rise or slope of the impressed voltage with changes in amplitude.

When the temperature changes, the resistance of the thermistor 12 changes inversely, in accordance with known thermistor action. The time constant of the circuit is determined by the product of the resistance of the thermistor and the capacitance of the capacitor and changes with variations in the temperature. The variation in the applied voltage of course provides a corresponding variation in speed. This circuit has also been found to provide a desirable linear control over at least a limited speed range such that the motor speed varies in equal increments for a given temperature change.

An RF filter circuit is connected to the lines 5 and 6 and includes a capacitor 20 connected across the lines and a choke coil 21 connected in series in line 5.

Additionally, a resistor 22 in series with a capacitor 23 is connected across the switch 7 to minimize voltage changes with time.

The operation of the circuit is briefly described as follows.

When power is applied, the full voltage is applied across the timing circuit 11. The neon regulator 19 clips the top or peak of the successive half cycles and an essentially constant voltage is applied across the timing circuit. The voltage division between capacitor 13 and thermistor 12 and the time constant are determined by the temperature of the thermistor 12. The charge on the capacitor 13 increases during the half cycle and after a period reaches a level sufficient to break down the symmetrical diode switch 14. When the switch 14 conducts, a current discharge path for the capacitor is provided through the switch 14 and the gate 8 of the triggered symmetrical switch 7. The symmetrical switch 7 is thus fired to conduct and continues to conduct during the corresponding half cycle and until the current reverses to apply to corresponding portion of the current to the motor 1.

During the opposite half cycle, the capacitor 13 similarly charges in the opposite direction. As a result of the symmetrical action of the symmetrical diode switch 14 and the triggered symmetrical switch 7, a corresponding portion of the opposite half cycle is impressed on the motor 1.

The motor 1 operates to drive the load at a speed related to the power pulses impressed thereon. For example, the motor 1 may be connected to drive a warm air furnace blower motor as in applicant's previously identified copending application or a refrigerating condenser fan motor as shown in U.S. Patent 3,196,629 to vary a temperature condition to which the thermistor 12 is subjected. As the sensed temperature changes, the resistance of the thermistor 12 varies. The time constant of the timing circuit of thermistor 12 and capacitor 13 is changed such that the firing point during the successive half cycles shifts and the power supplied to the motor 1 increases or decreases to correct the motor speed until a set point temperature is obtained. The circuit thus provides continuous variation or modulation of the energization of the motor 1 to maintain the thermistor 12 at a preselected set point. As previously noted, the voltage regulation provided by the neon regulator 19 and associated circuitry substantially increases the sensitivity of the circuit to variation in thermistor temperature while reducing the sensitivity to ambient temperature and minimizing the effects of input voltage variation such that the motor speed can be varied between a minimum and maximum speed in response to a relatively small variation in temperature. The precise responsive temperature range required to effect a change in applied voltage from zero to maximum upon the motor 1 of course depends upon the precise characteristics and components chosen. In one embodiment of the invention constructed in accordance with the present invention, the illustrated components were as follows:

Triggered symmetrical switch 7—GESC4ID No. 25, 400 volts
Symmetrical diode switch 14—GEZJ238 No. 20
Thermistor 12—GA52P2 No. 21, 200K ohms
Neon lamp 19—GENE83 78/54 volts
Resistor 17—IRC 102K ohms ½ watt 10%
Resistor 18—IRC resistor 123K ohms ½ watt 10%
Capacitor 13—Sprague capacitor 0.049 mfd. 200 WVDC The circuit was operated with a set point temperature of 125° at which 97% of full voltage was applied to the motor 1. The circuit had a 25% speed characteristic at 80° F.

Although the neon lamp regulator 19 provides a highly improved control, the characteristics of a neon lamp vary somewhat with operation and for some reason creates a slight direct current component in the motor circuit. The neon bulb apparently does not trigger precisely at the same point in the positive and negative half cycles for a given temperature and thereby produce a direct current component as a result of an asymmetrical application of power upon the motor. This causes heating and adverse characteristics in the timing circuit. The circuit tends to have a low maximum output voltage particularly when input voltage decreases from the normal or average value. The set point also tends to shift with input voltage variations. Consequently, although the circuit of FIG. 1 produces a noticeable improvement over prior art systems, for certain applications, the circuit had undesirable characteristics.

An improved circuit is shown in FIG. 2. The corresponding elements of FIGS. 1 and 2 are similarly numbered for simplicity and clarity of explanation.

Referring to FIG. 2, the motor 1 is connected to the power lines 5 and 6 through a triggered symmetrical switch 7 having a symmetrical diode switch 14 controlling the current to the gate 8 as in FIG. 1. The timing circuit 11 in FIG. 2 however is connected to the power lines 5 and 6 in series with the motor 1 and in parallel with switch 7 to show an alternative circuit connection, which could also be employed with the control of FIG. 1. Generally, in the circuit of FIG. 2, a single pulse is generated for each half cycle, whereas the circuit of FIG. 1 generates a train of pulses, as subsequently described. The circuit of FIG. 1 was found to be operable over a smaller effective temperature change, but as noted above had certain other disadvantages. Generally, the timing circuit 11 includes the current limiting resistor 17, the thermistor 12 and the capacitor 13 connected in series to the power lines 5 and 6 in series with motor 1. In the modified circuit of FIG. 2, a resistor 24 is parallel connected with the capacitor 13 rather than with the thermistor 12 as in FIG. 1 and forms a voltage dividing network with the thermistor 12. Further, the neon lamp regulator 19 is replaced with a novel diode bridge regulator 25 particularly forming a novel feature of the present invention. The diode bridge regulator includes four diodes 26 which may each be a bank of solid state diodes or the like interconnected in a closed bridge loop defining a pair of alternating current input junctions or terminals 27 and a pair of direct current output junctions or terminals 28. One A.C. terminal 27 is connected to the junction 29 of the current limiting resistor 17 and the thermistor 12 and the opposite A.C. terminal 27 is connected to the opposite power line 6 and thus to the lower side of the timing capacitor 13, as at junction 30. A Zener diode 31 or other similar device is connected between the D.C. terminals 28 and normally maintains an open circuit through the bridge regulator 25. When the voltage applied across the bridge regulator reaches the firing level of the Zener diode 31, the Zener diode conducts and holds the voltage at such level until the impressed half cycle drops below such level.

Generally, the circuit of FIG. 2 operates in the same manner as the circuit of FIG. 1. The diode bridge regulator 25 provides a clipped voltage across the timing circuit 11. The Zener diode 31 breaks down at a very precise value for a given input causes a breakdown at essentially the exact point in each of the positive and negative half cycles. Consequently, a highly symmetrical power wave is impressed on motor 1 and substantially reduces any D.C. component in the motor circuit.

In the embodiment of FIG. 2, the voltage regulator 25 maintains constant voltage across the timing circuit and particularly the voltage dividing network of resistor 24 and thermistor 12. The temperature of the thermistor 12 determines its resistance which through the voltage divider action determines the voltage drop across the capacitor and the time constant of the thermistor 12 and the capacitor 13. This simultaneous variation of the voltage and the time constant produces a rapid response. This dual action increases the sensitivity of the circuit to variations in temperature and permits reduction in the total temperature variation necessary to adjust the voltage applied to the motor 1 by triggering of the symmetrical triggered switch 7.

A 230 volt permanent split capacitor motor having six poles and rated ½ horsepower connected in a circuit similar to that illustrated in FIG. 2 was constructed with the following components:

Switch 7—GE SC41D #46 v. 6 amp.
Switch 14—GE ST2—#19R
Zener diode 25—VR 56B #r (59 v. actual) Zener
Diodes 26—IN 4002, 200 v.
Thermistor 12—GA51PZ #34, 100K ohms
Resistor 17—31.4K ohms IRC 10% 2 watts
Resistor 24—75.4K ohms IRC 10% ½ watt
Capacitor 13—CDE WMF 0.0455 mfd.

The motor was operated between a minimum or zero speed condition at 85° F. and a maximum speed condition equal to 97% of rated speed at 115° F.

Generally, the present invention and particularly the circuit shown in FIG. 2 permits wide selection of the temperature control range. Generally, a temperature range of about thirty degrees or greater is required for reliable operation, although the circuits have been operated with a corresponding decrease in operation well below this minimum change. With a proper selection of components, the maximum temperature variation can be increased substantially and in the device has been operated to provide control between minimum and maximum speed in response to a 70° F. variation.

The present invention thus provides a solid state motor control for alternating current motors which is highly sensitive to temperature and which substantially reduces the generation of direct current components in the motor circuit.

Various modes of carrying out the invention are contemplated as being within the scope of the following claims particularly pointing out and distinctly claiming the subject matter which is regarded as the invention:

I claim:

1. An alternating current dynamoelectric machine having a characteristic dependent upon the input voltage impressed on the dynamoelectric machine, an improved control circuit for varying the input voltage in accordance with a variable condition connected in series with a power line to the motor and comprising,
   a symmetrical alternating current switch means having an input terminal means for symmetrically switching each half cycle of the input voltage,
   a firing circuit for said switch means including a thermistor,
   a resistor connected in series with the thermistor to form a temperature sensitive voltage divider,
   a capacitor connected in parallel with the resistor,
   means connecting the junction of the resistor and the thermistor to the switch means to fire the switch means,
   input power terminals,
   a resistor connected in series with the voltage divider to the power terminals,
   a diode bridge circuit having alternating current terminals connected across the voltage divider and having direct current terminals, and
   a Zener type diode connected across the direct current terminals.

2. In a control for an alternating current load having a symmetrical actuable triggered power switch means and a trigger circuit including a condition responsive means connected in series with a timing capacitor to the power input means to define a timing circuit with the charging of the capacitor controlled by the sensed condition of said condition responsive means and the triggered power switch means being connected to the junction of the condition responsive means and the timing capacitor, the improvement in the trigger circuit comprising
   a voltage regulator connected across the condition responsive means and the timing capacitor to maintain an essentially constant voltage across the timing circuit to reduce the direct current component in the load circuit, said voltage regulator including a rectifying bridge including alternating current terminals connected across the timing circuit and direct current terminals, and
   a voltage breakdown device connected across the direct current terminals.

3. In a control for an alternating current load having a symmetrical actuable triggered power switch means and a trigger circuit including a condition responsive means connected in series with a timing capacitor to the power input means to define a timing circuit with the charging of the capacitor controlled by the sensed condition of said condition responsive means and the triggered power switch means being connected to the junction of the condition responsive means and the timing capacitor, the improvement in the trigger circuit comprising a voltage regulator connected across the condition responsive means and the timing capacitor to maintain an essentially constant voltage across the timing circuit to reduce the direct current component in the load circiut, said voltage regulator including a rectifying bridge including alternating current terminals connected across the timing circuit and direct current terminals, and a Zener type diode connected to the direct current terminals.

4. In a control for an alternating current load having a symmetrical actuable triggered power switch means and a trigger circuit including a condition responsive means connected in series with a timing capacitor to the power input means to define a timing circuit with the charging of the capacitor controlled by the sensed condition of said condition responsive means and the triggered power switch means being connected to the junction of the condition responsive means and the timing capacitor, the improvement in the trigger circuit comprising a voltage regulator connected across the condition responsive means and the timing capacitor to maintain an essentially constant voltage across the timing circuit to reduce the direct current component in the load circuit, said voltage regulator including a diode bridge circuit including at least four diode means connected in a closed loop and polarized to define a pair of opposite alternating current terminals and a pair of opposite direct current terminals, said alternating current terminals being connected to the opposite ends of the timing circuit, and a Zener diode connected between the direct current terminals to impress a maximum peak voltage upon the timing circuit, wherein said timing circuit is connected in series with the load and in parallel with the triggered power switch means.

5. In a control for an alternating current dynamoelectric machine having a symmetrically actuable triggered power switch means, the improvement in a trigger circuit for the switch means comprising a condition responsive impedance means having an impedance related to a sensed condition and connected in series with an impedance element to form a voltage dividing network, a capacitor connected across the impedance element and to the triggered power switch means at the junction of the condition responsive means and the timing capacitor, a voltage regulator connected across the voltage dividing network to maintain an essentially constant voltage across the timing circuit to reduce the direct current component in the motor circuit, said voltage regulator including a diode bridge circuit including at least four diode means connected in a closed loop and polarized to define a pair of opposite alternating current terminals and a pair of opposite direct current terminals, said alternating current terminals being connected to the opposite ends of the voltage dividing network, and a Zener diode connected between the direct current terminals to impress a maximum peak voltage upon the timing circuit.

6. In an alternating current dynamoelectric machine control having a characteristic dependent upon the input voltage impressed on the dynamoelectric machine, an improved control circuit for varying the input voltage in accordance with a variable condition and connected to the power lines for the motor and comprising a triggered symmetrical alternating current switch means having an input terminal means for symmetrically switching each half cycle of the input voltage, a firing circuit for said switch means including a timing means connected to the input terminal means by a voltage breakdown device, said timing means being reset by actuation of the switch means, condition responsive means having a variable electric state in accordance with the variable condition and being connected in series with the timing means in the firing circuit to control the timing means and adjust the firing time during each half cycle, a voltage regulator connected in parallel with the timing means and the condition responsive means to minimize the generation of a direct current component as the result of a symmetrical firing of the switch means, said voltage regulator including a diode bridge circuit including at least four diode means connected in a closed loop and polarized to define a pair of opposite alternating current terminals and a pair of opposite direct current terminals, said alternating current terminals being connected to the opposite ends of the timing circuit, and a Zener diode connected between the direct current terminals to impress a maximum peak voltage upon the timing circuit.

References Cited

UNITED STATES PATENTS

| | | | |
|---|---|---|---|
| 3,171,074 | 2/1965 | Momberg et al. | 318—345 XR |
| 3,192,462 | 6/1965 | James | 318—345 |
| 3,202,899 | 8/1965 | Gambill et al. | 318—345 XR |
| 3,305,716 | 2/1967 | Wigington | 318—345 XR |

OTHER REFERENCES

Application Note: Triac Control for AC Power, General Electric, May 1964.

Mungenast & Dowling, AC Motor Speed Control, Home Appliance Builder, August 1964 (pp. 13–15, 38).

ORIS L. RADER, *Primary Examiner.*

G. RUBINSON, *Assistant Examiner.*